(12) United States Patent
Nimbalker et al.

(10) Patent No.: US 8,194,603 B2
(45) Date of Patent: Jun. 5, 2012

(54) SUBFRAME COMPONENT REDUCTION AND NOTIFICATION IN A HETEROGENEOUS WIRELESS COMMUNICATION SYSTEM

(75) Inventors: Ajit Nimbalker, Arlington Heights, IL (US); Robert T Love, Barrington, IL (US); Vijay Nangia, Algonquin, IL (US); Ravikiran Nory, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 478 days.

(21) Appl. No.: 12/543,239

(22) Filed: Aug. 18, 2009

(65) Prior Publication Data

US 2011/0044259 A1 Feb. 24, 2011

(51) Int. Cl.
*H04W 72/04* (2009.01)
*H04W 28/16* (2009.01)
*H04W 74/00* (2009.01)

(52) U.S. Cl. .................... 370/329; 455/451; 455/454

(58) Field of Classification Search .................. 370/254, 370/328–330; 455/450, 451, 452.1, 452.2, 455/454
See application file for complete search history.

(56) References Cited

U.S. PATENT DOCUMENTS

| | | | |
|---|---|---|---|
| 2006/0098567 A1 | 5/2006 | Willenegger et al. | |
| 2006/0274712 A1 | 12/2006 | Malladi et al. | |
| 2010/0034163 A1* | 2/2010 | Damnjanovic et al. | 370/329 |
| 2010/0103885 A1* | 4/2010 | Cordeiro et al. | 370/329 |
| 2010/0173637 A1* | 7/2010 | Damnjanovic et al. | 455/447 |
| 2010/0195583 A1 | 8/2010 | Nory et al. | |
| 2010/0232373 A1 | 9/2010 | Nory et al. | |
| 2010/0272017 A1* | 10/2010 | Terry et al. | 370/328 |
| 2010/0331030 A1* | 12/2010 | Nory et al. | 455/509 |
| 2011/0096734 A1* | 4/2011 | Damnjanovic et al. | 370/329 |
| 2011/0103509 A1* | 5/2011 | Chen et al. | 375/295 |

OTHER PUBLICATIONS

3rd Generation Partnership Project; Technical Specification Group Radio Access Networks; 3G Home NodeB Study Item Technical Report Release 8) (3GPP TR 25.820 V8.2.0) (Sep. 2008), pp. 1-40.*
Ravikiran Nory et al., "Control and Data Signaling in Heterogeneous Wireless Communication Networks", U.S. Appl. No. 61/220,556, filed Jun. 25, 2009.
Huawei, "Further Considerations on PDCCH for Carrier Aggregation", 3GPP TSG RAN WG1 Meeting #57bis, Jun. 29-Jul. 3, 2009, pp. 1-4, R1-092378, Los Angeles, California, USA.

* cited by examiner

*Primary Examiner* — Chi Pham
*Assistant Examiner* — Ahmed Elallam
(74) *Attorney, Agent, or Firm* — Sylvia Chen (57) ABSTRACT

A wireless base unit (102) supporting carrier aggregation determines a truncation time period (159, 169) in order to create a reduced subframe component (154, 164) on an additional component carrier (120) such that the truncated subframe component (154, 164) does not interfere with the control region (171, 172) of a subframe (170, 180) transmitted on an overlapping component carrier (130) by an uncoordinated second base unit (105). The wireless base unit (102) transmits the truncated subframe component (154, 164) and also transmits truncation time period information within a control region (151, 161) of an anchor carrier (110). A remote terminal (104, 108) that supports carrier aggregation searches a control region (151, 161) of a subframe (150, 160) transmitted on the anchor carrier (110) for truncation information and uses the truncation information to determine a boundary of a data region in a subframe component (154, 164) received on the additional component carrier (120).

20 Claims, 5 Drawing Sheets

SUBFRAME COMPONENT REDUCTION AND NOTIFICATION IN A HETEROGENEOUS WIRELESS COMMUNICATION SYSTEM

FIELD OF THE DISCLOSURE

The present disclosure relates generally to wireless communications in a heterogeneous wireless network and, more particularly, to carrier aggregation and management of interference among the uncoordinated deployment of Home eNode-Bs (HeNBs) within a wireless network of eNode-Bs (eNBs).

BACKGROUND OF THE DISCLOSURE

According to LTE Release 8, downlink communications from a base unit (eNB) to a wireless communication device (user equipment or "UE") utilize orthogonal frequency division multiplexing (OFDM). In using OFDM, orthogonal subcarriers are modulated with a digital stream, which may include data, control information, or other information, to form a set of OFDM symbols. The orthogonal subcarriers may be contiguous or non-contiguous frequency bands, and the downlink data modulation may be performed using quadrature phase shift-keying (QPSK), 16-ary quadrature amplitude modulation (16QAM), or 64QAM.

Fourteen OFDM symbols are configured into a one millisecond (1 ms) downlink subframe for transmission from the base unit in the normal Cyclic Prefix (CP) case (and twelve OFDM symbols for the extended CP case). Within a subframe, data from a serving base unit is transmitted to its UEs on a Physical Downlink Shared CHannel (PDSCH) and control information is signaled on a Physical Downlink Control CHannel (PDCCH).

Control information in the PDCCH is transmitted using scheduling messages of different predefined downlink control information (DCI) Formats. These scheduling messages inform a UE of the downlink control information (e.g., modulation and coding scheme, transport block size and location, pre-coding information, hybrid-ARQ (HARQ) information, UE identifier, etc.) that is required to decode the downlink data transmissions in the PDSCH or to transmit the uplink data on the Physical Uplink Shared CHannel (PUSCH). This control information is protected by channel coding (typically, a cyclic-redundancy check (CRC) code for error detection and convolutional encoding for error correction), and the resulting encoded bits are mapped on the time-frequency resources of the downlink subframe.

The smallest time-frequency resource unit for transmissions is denoted a resource element (RE), which is one OFDM symbol (smallest time unit) by one subcarrier (smallest frequency unit). A group of four REs (or four REs plus two reference signal REs) is called a resource element group (REG). Nine REGs can make a Control Channel Element (CCE). The encoded PDCCH bits are typically mapped onto 1, 2, 4, or 8 CCEs, which are referred to as aggregation levels 1, 2, 4, and 8.

The UE searches different hypotheses (i.e., hypotheses on the aggregation level, DCI Format size, etc.) by attempting to decode downlink transmissions using a finite number of allowable configurations. This process is referred to as "blind decoding". For example, a UE performs blind decoding using the starting CCE locations allowed for that particular UE. This UE-specific search space is typically configured during initial set-up of a radio link and can be modified using a Radio Resource Control (RRC) message. Similarly, a common search space is also defined that is valid for all UEs being served by the same eNB and might be used to schedule broadcast downlink information like Paging, Random Access Response, or others.

A particular UE must locate the CCEs corresponding to each PDCCH candidate it is to monitor (i.e., blindly decode for each subframe control region). The CRC of each PDCCH is typically masked (e.g., using an exclusive-OR operation) by an identifier corresponding to the user equipment that the base unit is trying to schedule. The identifier is assigned to the UE by its serving base unit. This identifier is known as a radio network temporary identifier (RNTI). There are several types of RNTIs, such as cell RNTIs (C-RNTIs), semi-persistent scheduling RNTIs (SPS-RNTIs), and temporary cell RNTIs (TC-RNTIs). When a UE decodes a PDCCH, it must apply the appropriate RNTI in the form of a mask to the PDCCH CRC for successful PDCCH decoding to occur. When a UE successfully decodes a PDCCH of a particular DCI Format type, it uses the control information from the decoded PDCCH to determine, for example, the resource allocation, hybrid-ARQ information, and power control information for the corresponding scheduled downlink data transmission.

In addition to PDCCH signaling, a control region of a downlink subframe also includes a Physical Hybrid-ARQ Indicator CHannel (PHICH) that is used to transmit hybrid-ARQ acknowledgements, reference signals, and a Physical Control Format Indicator CHannel (PCFICH). In the context of LTE Release 8, each eNB-to-UE downlink has 1, 2, or 3 OFDM symbols at the beginning of each subframe for control signals. The number of OFDM symbols in this control region may vary each subframe and is signaled via the PCFICH in that same subframe. In some cases, the value of PCFICH may be signaled via higher layer signaling or may be fixed.

All the remaining OFDM symbols in the subframe are typically considered the data region of the subframe, and these symbols create the PDSCH. PDSCH transmissions can be mapped into one or more resource blocks (RBs). Typically, an RB is a set of subcarriers and a set of OFDM symbols. For example, an RB may contain 12 subcarriers (with a subcarrier separation of 15 kHz) and 7 OFDM symbols, with some resource elements being assigned to carry pilot signals, etc. PDSCH allocations for a UE are typically scheduled in pairs of RBs, with each RB pair spanning a single subframe and indexed using a single RB identifier.

In a heterogeneous wireless network, HeNBs (also called femto-cells, pico-cells, or closed subscriber group (CSG) cells) can be deployed to operate in regions where at least part of the femto-cell's bandwidth is shared with eNB macro-cells. Due to the shared bandwidth, this type of deployment is considered to be high risk from an interference point-of-view. For example, a downlink of a macro-cell eNB can severely interfere with a downlink of a femto-cell HeNB thereby degrading the quality of service for UEs served by either the eNB or the HeNB.

LTE Release 8 is expected to evolve into LTE-A to support spectrum aggregation wherein a base unit can transmit data on multiple component carriers in a single subframe and a user terminal can receive multiple component carriers in a single subframe. Thus, if additional component carriers are available to macro-cells, there comes an increased risk of interference due to overlapping macro-cell and femto-cell component carrier frequencies.

The various aspects, features and advantages of the disclosure will become more fully apparent to those having ordinary skill in the art upon careful consideration of the following Drawings and accompanying Detailed Description.

DETAILED DESCRIPTION

By using signals in a control region of an OFDM subframe transmitted on an anchor carrier to indicate a truncated portion of a subframe component transmitted on an additional component carrier, a base unit can assist a UE in avoiding subframe decoding errors related to the additional component carrier. In addition to indicating the truncated portion of a subframe component on an additional component carrier, cross-carrier notifications can provide other control information for the additional component carrier. Note that truncation information can also be repeated on the additional component carrier itself.

Use of this scheme can support interference management in heterogeneous wireless networks. For example, if a macro-cell base unit is operating using an anchor carrier CC1 and an additional component carrier CC2, and a femto-cell base unit is operating in an overlapping geographic region using the second component carrier CC2, the control region of a macro-cell subframe component transmitted on CC2 may overlap with the control region of a femto-cell subframe also transmitted on CC2 and result in UEs being unable to decode either control region properly. Assuming (but not requiring) internetworking between the macro-cell's network infrastructure and the femto-cell's network infrastructure, so that the macro-cell base unit is aware of the femto-cell's control region (which may vary from one subframe to the next), the macro-cell base unit can truncate a subframe component on the shared component carrier CC2 to avoid overlapping control regions. Even if the macro-cell is unaware of a femto-cell's control region, the macro-cell may truncate a subframe component on a dynamic basis in an attempt to reduce interference with the femto-cell transmissions. By using cross-carrier notifications in an anchor carrier subframe, the macro-cell base unit can transmit the truncation information to its UEs so that the UEs can properly detect a boundary of the macro-cell subframe component on the additional component carrier CC2.

Figure 1:
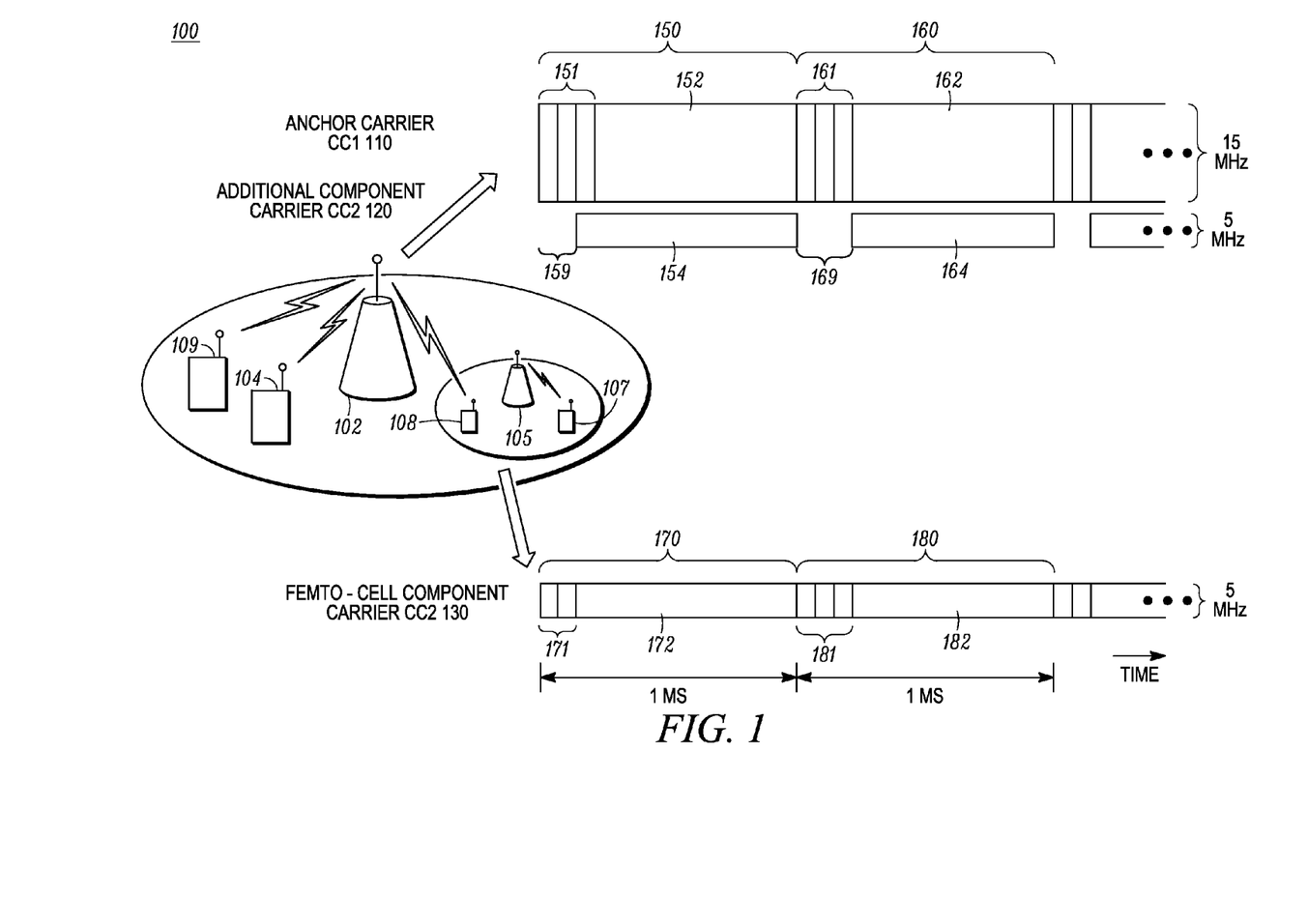
FIG. 1 illustrates wireless downlink communications in a heterogeneous network.

FIG. 1 illustrates wireless downlink communications in a heterogeneous wireless network 100. In the heterogeneous wireless network 100, a first base unit 102 (sometimes called a base unit, access point, or eNB) supports carrier aggregation with an anchor carrier 110 using an anchor carrier CC1 and an additional component carrier 120 using a second component carrier CC2. This first base unit 102 represents a macro-cell that has a geographic coverage area overlapping a femto-cell (sometimes called a pico-cell, a closed subscriber group (CSG) cell, an access point, or an HeNB). The femto-cell (second) base unit 105 transmits on a femto-cell component carrier 130 using the second component carrier CC2. Thus, the macro-cell and the femto-cell share the second carrier component CC2 but only the macro-cell uses the anchor carrier component CC1. Due to the shared second component carrier CC2, there is a significant risk of interference between the macro-cell and the femto-cell wireless transmissions. Also, the macro-cell could use additional component carriers CC3, CC4, CC5, etc. that may potentially interfere with additional femto-cells using those same component carriers CC3, CC4, CC5 or overlapping carriers.

A heterogeneous network 100 is generally implemented with more than two base units, and only two are shown for the sake of simplicity. The wireless communication system 100 also includes management functionality including data routing, admission control, subscriber billing, terminal authentication, etc., which may be controlled by other network entities (not shown), as is known generally by those having ordinary skill in the art.

The femto-cell base unit 105 is shown serving a remote terminal 107 within a serving area (or hot spot) that overlaps the serving area of the macro-cell base unit. Remote terminals may also be referred to as subscriber units, mobile stations, user equipment (UE), user terminals, or by other terminology. Due to the overlapping geographic coverage and the overlapping frequency usage, this scenario has high risk for wireless transmission interference. Note that, although the hot spot is shown as fully contained within the macro-cell, alternate configurations may have the hot spot only partially overlapping the macro-cell.

The macro-cell base unit 102 is shown serving remote terminals 104, 108, 109 within a serving area (or cell) or within a sector of the base unit. The macro-cell base unit 102 communicates wirelessly with remote terminals 104, 108, 109 to perform functions such as scheduling the remote terminals to receive or transmit data using available PDSCH radio resources. Two of the remote terminals 104, 108 support carrier aggregation and could receive signals on both the anchor carrier 110 and at least one additional component carrier 120. The macro-cell base unit 102 serves another remote terminal 109 that does not support carrier aggregation and thus cannot receive PDSCH transmissions across multiple downlink component carriers.

As shown, the macro-cell base unit 102 transmits downlink (DL) communication signals to remote terminals 104, 108 using both an anchor carrier 110 and at least one additional component carrier 120. Although two carrier-aggregated component carriers are shown, the number of component carriers can be greater or fewer depending on the base unit's implementation and utilization. Each subframe 150, 160 transmitted on an anchor carrier 110 generally includes a control region 151, 161 and a data region 152, 162. The control region 151, 161 can vary in time span and can be one, two or three OFDM symbols in duration. This variable (whether the control region 151, 161 contains 1, 2, or 3 OFDMA symbols) is signaled in the control region of the current subframe 150, 160 on a Physical Control Format Indicator CHannel (PCFICH) as will be explained in more detail in conjunction with FIG. 2.

The macro-cell base unit 102 can also transmit DL communication signals on an additional component carrier 120. Within the 1 ms time span for a subframe, a front-truncated subframe component 154, 164 contains signals to remote terminals 104, 108 in a PDSCH. The front-truncated subframe component 154, 164 does not contain signals that might overlap with a control region 171, 181 in subframes 170, 180 sent on an overlapping component carrier 130 by an uncoordinated second base unit 105. Thus, the reduced subframe components 154, 164 on the additional component carrier 120 are shortened at the front of the subframe component by a front-truncation time period 159, 169. This time period 159, 169 can be measured in OFDM symbol time spans and is expected to be 1, 2, or 3 OFDM symbols in duration. Other implementations, however, could allow for different time periods and different truncation timing (e.g., back-truncation). By truncating subframe components 154, 164, the macro-cell avoids transmitting on the same component carrier CC2 frequencies (or overlapping carrier frequencies) during the DL subframe control regions of the geographically overlapping femto-cell, and downlink signal interference can be reduced.

On the femto-cell component carrier 130, each subframe 170, 180 also includes a control region 171, 181 and a data region 172, 182. As with the anchor carrier 110 of the macro-cell network, the control region 171, 181 of each subframe 170, 180 on the femto-cell component carrier 130 can be 1, 2, or 3 OFDM symbols in duration. By creating front-truncated subframe components 154, 164 on the additional component carrier 120 of the first network, signals transmitted on the second component carrier CC2 by the first base unit 102 will not overlap the control regions 171, 181 of the subframes 170, 180 transmitted by the second base unit 105.

Because the control region 171, 181 of the femto-cell subframes 170, 180 may vary in duration, the front-truncation time period 159, 169 of the reduced subframe components 154, 164 on the additional component carrier 120 may also vary. For example, the femto-cell control region 171 in the first subframe 170 has a duration of two OFDM symbols while the femto-cell control region 181 in the second subframe 180 has a duration of three OFDM symbols. Consequently, the front-truncation time period 159 of the first front-truncated subframe component 154 is two OFDM symbols in duration and the front-truncation time period 169 of the second front-truncated subframe component 164 is three OFDM symbols in duration. In this embodiment, the front-truncation is dynamic on a subframe basis. In other embodiments, front-truncation can be dynamic on a radio frame basis (e.g., the same front-truncation time period is used for all ten subframe components in a radio frame, or all downlink subframes in a radio frame in the case of TDD deployments) or semi-static basis (e.g., between two RRC reconfiguration messages). Also, the front-truncation time periods 159, 169 need not match exactly to the corresponding femto-cell subframe control regions 171, 181. As long as the truncation time period 159, 169 prevents the macro-cell base unit 102 from transmitting on the additional component carrier 120 at the same time as a control region 171, 181 of the femto-cell, interference can be reduced.

With a variable front-truncation time period 159, 169, the remote terminals 104, 108 being served by the base unit 102 must know when to detect the first OFDM symbol of the front-truncated subframe components 154, 164. If the first OFDM symbol is not correctly detected, the UE will store incorrect data in its buffer and feed back NACK to the macro-cell base unit 102, which may propagate errors through subsequent HARQ combining. Therefore a CRC code may be used to check the correct detection of the first OFDM symbol—or the data should be mapped to the invariant resources first, followed by the resources that are variable. Thus, for example, the data can be mapped to the OFDM symbol 14, followed by OFDM symbol 13, and so on to the first OFDM symbol in the truncated subframe component (which would most likely be OFDM symbol 4, 3, or 2). Thus if an error is made in the detecting the first OFDM symbol in the truncated subframe component, there will be only a partial corruption of data because the data mapped to OFDM symbols 14, 13, etc. will not necessarily be corrupted.

Figure 2:
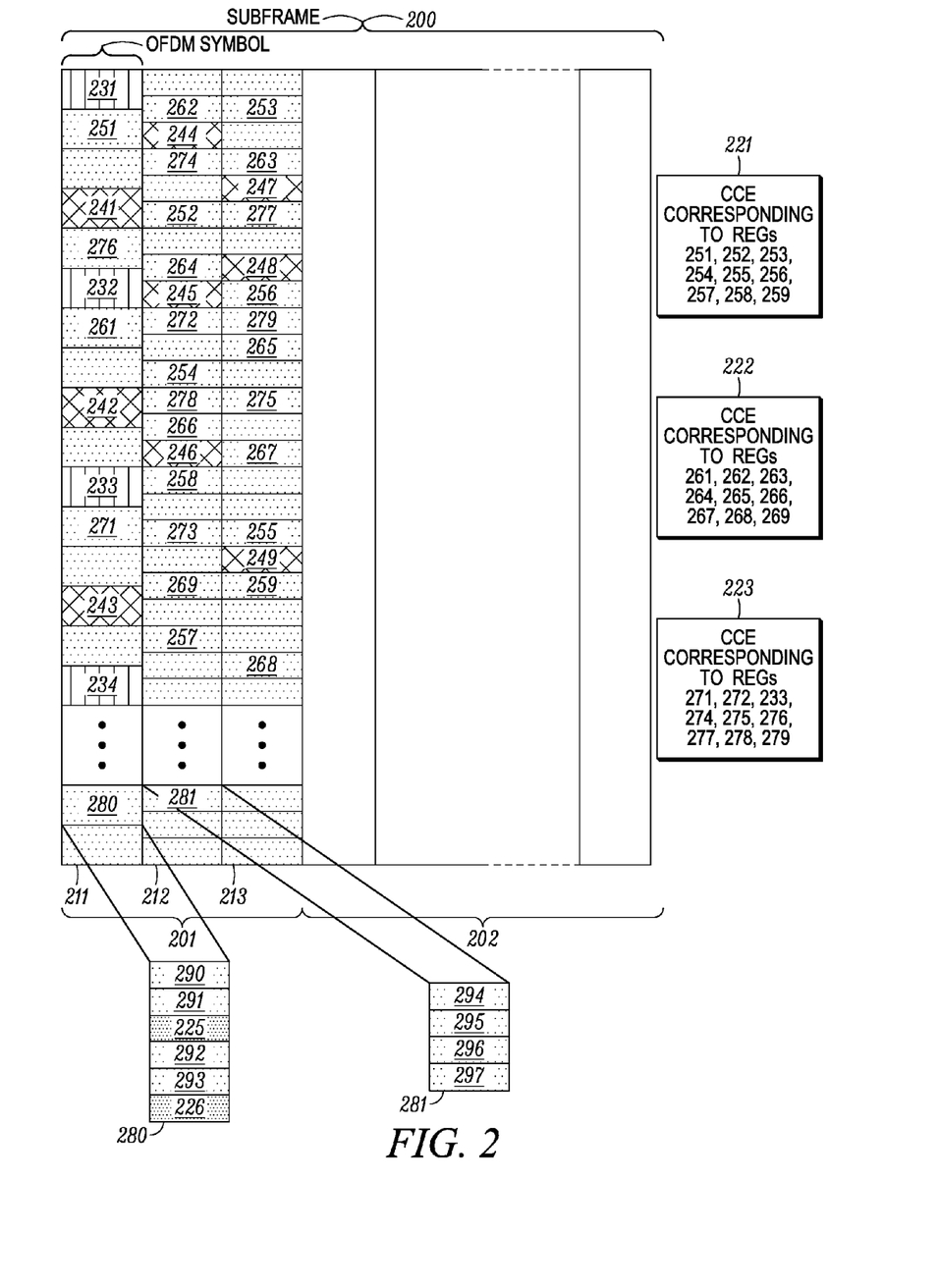
FIG. 2 illustrates a downlink radio subframe on an anchor carrier with various resources allocated for signaling a front-truncation time period of a front-truncated subframe component on an additional component carrier.

FIG. 2 illustrates a downlink radio subframe 200 on an anchor carrier 110 (see FIG. 1) with various resources allocated for signaling a front-truncation time period 159, 169 of a front-truncated subframe component 154, 164 on an additional component carrier 120. This downlink subframe 200 constitutes a portion of a radio frame (not shown). A radio frame generally has a concatenated continuum of subframes. In FIG. 2, the subframe 200 includes a control region 201 and a data region 202 akin to the subframes 150, 160, control regions 151, 161, and data regions 152, 162 shown in FIG. 1. This subframe 200 shows three OFDM symbols 211, 212, 213 in the control region 201. Other subframes may have 1, 2, or 3 OFDM symbols in their control regions.

As mentioned earlier, resource elements (REs) in the control region 201 are used to signal control information to remote terminals in the network. In the control region 201, resource element groups (REGs) are used for mapping control channels to REs. A REG may have REs that are mapped to only control channels or REs that are mapped to both control channels and reference signals. In FIG. 2, REGs in a first OFDM symbol 211 contains REs that are mapped to both control channels and reference signals. REGs in the second OFDM symbol 212 and the third OFDM symbol 213 are mapped to only control channels. For example, REG 280 in the first OFDM symbol 211 has six REs where, REs 290, 291, 292, 293 are mapped to a control channel and REs 225 and 226 are mapped to reference signals. REG 281 in the second OFDM symbol 212 has four REs where REs 294, 295, 296, 297 are mapped to a control channel and no REs are mapped to other signals.

One or more REGs 231, 232, 233, 234 are reserved for Physical Control Format Indicator Channel (PCFICH) signaling. The PCFICH carries information about the number of OFDM symbols used for transmission of a control region in a subframe. The PCFICH is transmitted when the number of OFDM symbols for the control region is greater than zero.

REGs 241, 242, 243, 244, 245, 246, 247, 248, 249 are reserved for Physical Hybrid-ARQ Indicator CHannel (PHICH) signaling as directed by higher network layers of the base unit. In one embodiment, default PHICH resources on REGs 241, 242, 243 provisioned by LTE Release 8 provisioning mechanisms can be utilized to support ACK/NACK for default Physical Uplink Shared CHannel (PUSCH) transmissions by served remote terminals 104, 108, 109. The additional reserved REGs 244, 245, 246, 247, 248, 249 can be used to broadcast or multicast the front-truncation time period 159 of a front-truncated subframe component 154 on the second component carrier 120 (shown in FIG. 1).

Thus, the signals on the default PHICH REGs carry the hybrid-ARQ ACK/NAK for uplink physical resource blocks signaled using the one or more assigned physical uplink shared channels. According to LTE Release 8, multiple PHICHs mapped to the same set of resource elements constitute a PHICH group, where PHICHs within the same PHICH group are separated through different orthogonal sequences. A single PHICH group can require a plurality of REGs. For example, a PHICH group is commonly assigned three REGs, which are REGs 241, 242, 243 in this subframe 200. The over-provisioned PHICH REGs 244, 245, 246, 247, 248, 249 can also be grouped, and spreading and repetition in accordance with PHICH groups as described previously can be used to promote low errors rates when these PHICH REGs are used to signal truncation information for a second component carrier CC2.

In another embodiment, resources on all the PHICH REGs 241, 242, 243, 244, 245, 246, 247, 28, 249 can be shared for both default PHICH signaling and signaling of front-truncation information. In this embodiment, default PHICH signaling and signaling of front-truncation information are separated through different orthogonal sequences. In certain cases (e.g., in subframes where the macro-cell is not assigning resources on the additional component carrier), there may be no need to transmit truncation information. In such cases, the sequence used for front-truncation information in one subframe may be used for HARQ feedback signaling in another subframe.

The front-truncation information can be limited to an indication of whether the front-truncation is 1, 2, or 3 OFDM symbols in duration. Because this is similar to the information carried in a PCFICH (i.e., whether a control region of a particular subframe is 1, 2, or 3 OFDM symbols in duration), PCFICH-like signaling and encoding can be used on the over-provisioned PHICH resources to indicate whether the front-truncation time period 159, 169 in a reduced subframe component 154, 164 is 1, 2, or 3 OFDM symbols in duration. Alternately, the front truncation information signaled on reserved PHICH resources can be encoded with an error detection code, such as a CRC code, that will allows the front-truncation information to be read only by UEs that are using the same CRC code to properly decode the truncation time period information on those resources.

For remote terminals that support carrier aggregation (such as remote terminals 104, 108 shown in FIG. 1), REGs 241, 242, 243, 244, 245, 246, 247, 248, 249 reserved for PHICH signaling will carry both PHICH signaling and front-truncation signaling for at least one additional component carrier. In order for a UE to properly interpret the signals on the reserved PHICH REGs as either PHICH signaling or front-truncation signaling, a base unit that supports carrier aggregation (such as base unit 102 shown in FIG. 1) informs its remote terminals that support additional component carriers (such as remote terminals 104, 108), via dedicated Radio Resource Control (RRC) signaling, broadcast RRC signaling, or an implicit indication, that PHICH REGs have been reallocated. An implicit indication could be a particular downlink bandwidth of an anchor carrier, a particular Physical Cell IDentifier (PCID) of an anchor carrier, or a particular subframe index of a subframe transmitted on an anchor carrier. PHICH resources can be reallocated on a dynamic basis (e.g., every subframe or every radio frame) or on a semi-static basis (e.g., between two RRC reconfiguration messages). The set of PHICH resources that are reallocated may change or hop (e.g., on a subframe basis or on a radio frame basis) for interference randomization.

The RRC signaling can directly specify the PHICH group indices, or a subset of PHICH indices within each PHICH group, that have been reallocated to front-truncation signaling. Alternately, the RRC signaling can merely indicate the quantity of PHICH groups, or the quantity of PHICH resources within each PHICH group, that have been reallocated directly using a number or indirectly using a scaling factor or modulo function. In a case where the RRC signaling indicates a quantity, a remote terminal can use a predefined conversion function to calculate the set of REGs, or the orthogonal codes within each PHICH group, used to signal the front-truncation information. If the remote terminal receives both the quantity of reallocated PHICH groups and the PHICH group indices, the remote terminal can verify one received data point using the other received data point. Alternately, if the remote terminal receives both the quantity of PHICHs with each PHICH group and the subset of PHICH indices within each PHICH group, the remote terminal can verify one received data point using the other received data point.

Legacy remote terminals that do not support carrier aggregation (such as remote terminal 109 shown in FIG. 1) will be configured by the eNB to receive their PHICH information only on the default PHICH resources and not on any additional PHICH resources. The default PHICH reception mechanism (either the default PHICH group or the orthogonal codes in each PHICH group) corresponding to default PUSCH transmissions remains unchanged, so the PHICH reception of remote terminals that do not support carrier aggregation will be mostly unaffected.

A Physical Downlink Control CHannel (PDCCH) carries scheduling assignments and other control information. A physical downlink control channel is transmitted on an aggregation of one or several consecutive control channel elements (CCEs), where a CCE corresponds to multiple interleaved REGs. In the subframe 200 shown, interleaved REGs 251, 252, 253, 254, 255, 256, 257, 258, 259 correspond to a first CCE 221 that is reserved for PDCCH signaling. REGs within a CCE can be mapped in non-contiguous time and frequency locations within the control region 201 for increased time and frequency diversity. Such mapping can be achieved by applying a mapping function. Further, the mapping function could be conditioned on an interleaver that permutes the REGs corresponding to the CCE.

As an alternate (or addition) to using over-provisioned PHICH resources for front-truncation signaling, one or more CCEs are mapped such that the REGs corresponding to the reallocated CCE can be utilized for signaling the front-truncation time period 159, 169 of a reduced subframe component 154, 164 on an additional component carrier 120 (see FIG. 1). In FIG. 2, CCE 222 corresponding to interleaved REGs 261, 262, 263, 264, 265, 266, 267, 268, 269 is reallocated to support front-truncation signaling. Note that, although an entire CCE is reallocated for truncation signaling, not all REGs in a reallocated CCE will need to be utilized for truncation signaling. Using a CRC code and RNTI mask developed for additional component carrier configuration signaling, the reallocated CCE can be encoded such that selected remote units can properly decode the CCE REGs, using blind decoding, to obtain truncation information. If cross-carrier grants are not present in a particular subframe, this can also be signaled in the control region of the anchor carrier to reduce blind decoding. Also, the control region of the anchor carrier can include a value that indicates whether the DCI Format size for a particular cross-carrier grant is based on partial additional carrier bandwidth utilization (e.g., one-quarter, one-half, or full additional carrier bandwidth utilization).

CCEs in a given subframe that are mapped to support truncation signaling for reduced subframe components on an additional component carrier can be reverted back to supporting PDCCH signals in other subframes that do not require front-truncation signaling. FIG. 2 illustrates a CCE 223 corresponding to interleaved REGs 271, 272, 273, 274, 275, 276, 277, 278, 279 that were mapped for truncation signaling in a previous subframe(not shown), and has been reverted back to PDCCH use in the current subframe 200.

Remote terminals that do not support carrier aggregation (such as remote terminal 109 shown in FIG. 1) will be unaware of the CCE 222 reallocation from PDCCH signaling to truncation signaling. If the remote terminal monitors a reallocated CCE 222 while searching for its PDCCH, signaling on the reallocated CCE 222 will not correspond to a valid PDCCH signal (because it is being used by the base unit to signal truncation information). The remote terminal will then simply skip the reallocated CCE 222 and monitor other CCEs in search of its PDCCH signals.

Remote terminals that support carrier aggregation (such as remote terminals 104, 108 shown in FIG. 1), will need to receive an indication regarding CCEs reallocated to truncation signaling in order to properly decode the truncation signals. Thus, a base unit that supports carrier aggregation (such as base unit 102 shown in FIG. 1) informs its remote terminals that support additional component carriers (such as remote terminals 104, 108), via dedicated Radio Resource Control (RRC) signaling, broadcast RRC signaling, or an implicit indication, that one or more CCEs have been reallocated to truncation signaling. CCEs can be reallocated on a dynamic basis (e.g., every subframe or every radio frame) or on a semi-static basis (e.g., between two reconfiguration messages). An implicit indication could be a particular downlink bandwidth of an anchor carrier, a particular Physical Cell IDentifier (PCID) of an anchor carrier, or a particular subframe index of a subframe transmitted on an anchor carrier. The set of CCEs that are reallocated may change or hop (e.g., on a subframe basis or on a radio frame basis) for interference randomization or so as to avoid blocking a PDCCH signaled on a particular set of aggregated CCEs.

The dedicated and/or broadcast RRC signaling can directly specify the CCE indices that have been reallocated from PDCCH signaling to truncation signaling. For example, the three CCEs with the highest index numbers could support truncation signaling for an additional component carrier, and the two CCEs with the next-highest index numbers could support truncation signaling for another additional component carrier. Alternately, the RRC signaling can merely indicate the quantity of CCEs that have been reallocated directly using a number or indirectly using a scaling factor. In a case where the RRC signaling indicates a quantity, a remote terminal can use a predefined conversion function to calculate the set of CCE REGs used to signal the truncation information. If the remote terminal receives both the quantity of reallocated CCEs and the CCE indices, the remote terminal can verify one received data point using the other received data point.

Figure 3:
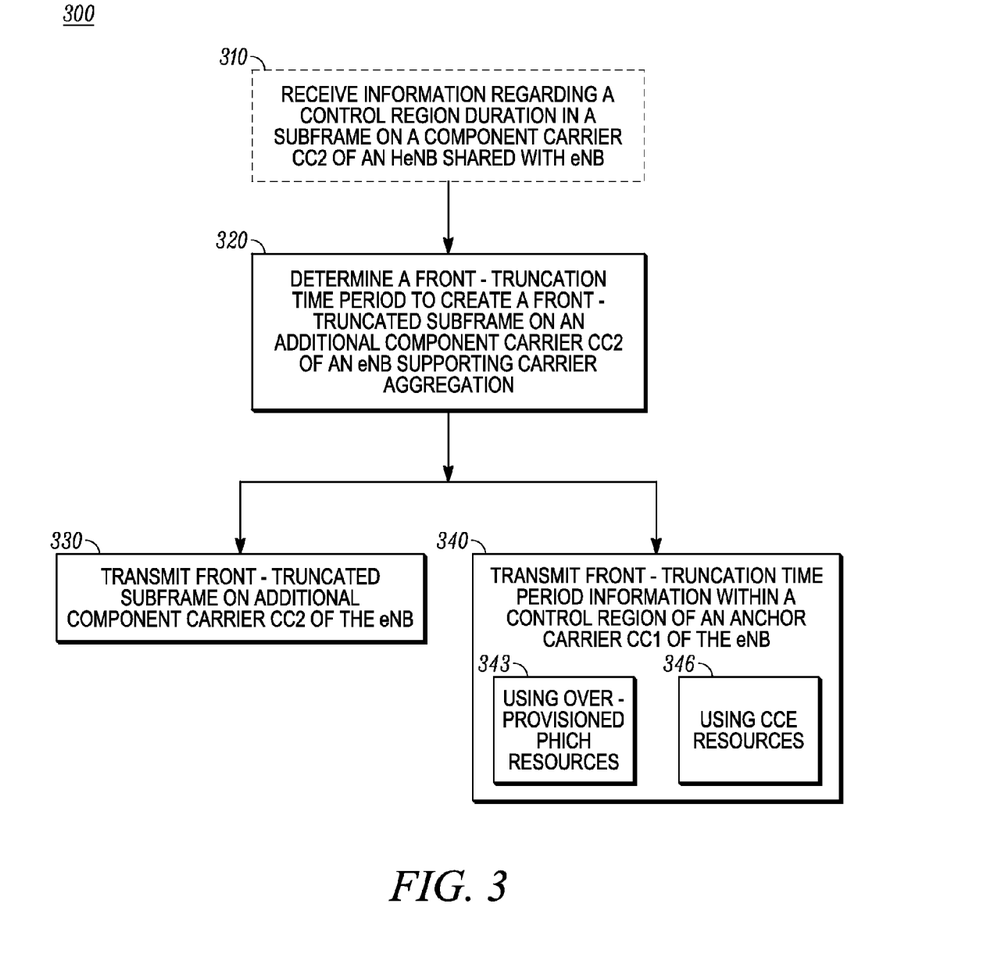
FIG. 3 illustrates a flow diagram for a base unit indicating, in a control region of a subframe on an anchor carrier, a front-truncation time period and transmitting a front-truncated subframe component on an additional component carrier.

FIG. 3 illustrates a flow diagram 300 for a first base unit 102 indicating, in a control region 151, 161 of a subframe 150, 160 on an anchor carrier 110, a front-truncation time period 159, 169 and transmitting a front-truncated subframe component 154, 164 on an additional component carrier 120 (see FIG. 1). A first base unit (such as base unit 102 shown in FIG. 1) that supports carrier aggregation receives 310 information regarding a control region duration in a subframe on a downlink component carrier being shared with an uncoordinated second base unit (such as base unit 105 shown in FIG. 1). The control region duration information can be provided on a dynamic (e.g., subframe or radio frame) basis by, for example, the HeNB using a wired backhaul to the eNB to transmit the HeNB subframes' control region duration. Alternately, the control region duration information can be provided on a semi-static basis (e.g., between two internetworking messages from the second base unit's network to the first base unit). Because control region durations may change on a dynamic (e.g., every subframe or every radio frame) or semi-static (e.g., using RRC configuration messages) basis, step 310 is optional in some instances. In another case, the eNB may dynamically vary the truncation information in an attempt to reduce interference on the shared component carrier CC2.

The first base unit determines 320 a front-truncation time period in order to create a front-truncated subframe component on the second component carrier CC2 that does not interfere with the control region of the second base unit's subframe on the same or overlapping second component carrier CC2. In an embodiment, the front-truncation time period references the number of OFDM symbols in a 1 ms subframe where the base unit would not transmit in order to limit interference with the control region of a subframe simultaneously-transmitted by the second base unit.

The first base unit then transmits 330 a front-truncated subframe component 154, 164 (see FIG. 1) on the additional component carrier CC2 and simultaneously transmits 340 front-truncation time period information within a control region of an anchor carrier CC1. The front-truncation time period information can be transmitted using 343 over-provisioned PHICH resources and/or using 346 reallocated CCE resources as described with reference to FIG. 2. If the front-truncation time period is equivalent to 1, 2, or 3 OFDM symbols, PCFICH-like signaling can be used on the over-provisioned PHICH resources or the reallocated CCE resources.

Figure 4:
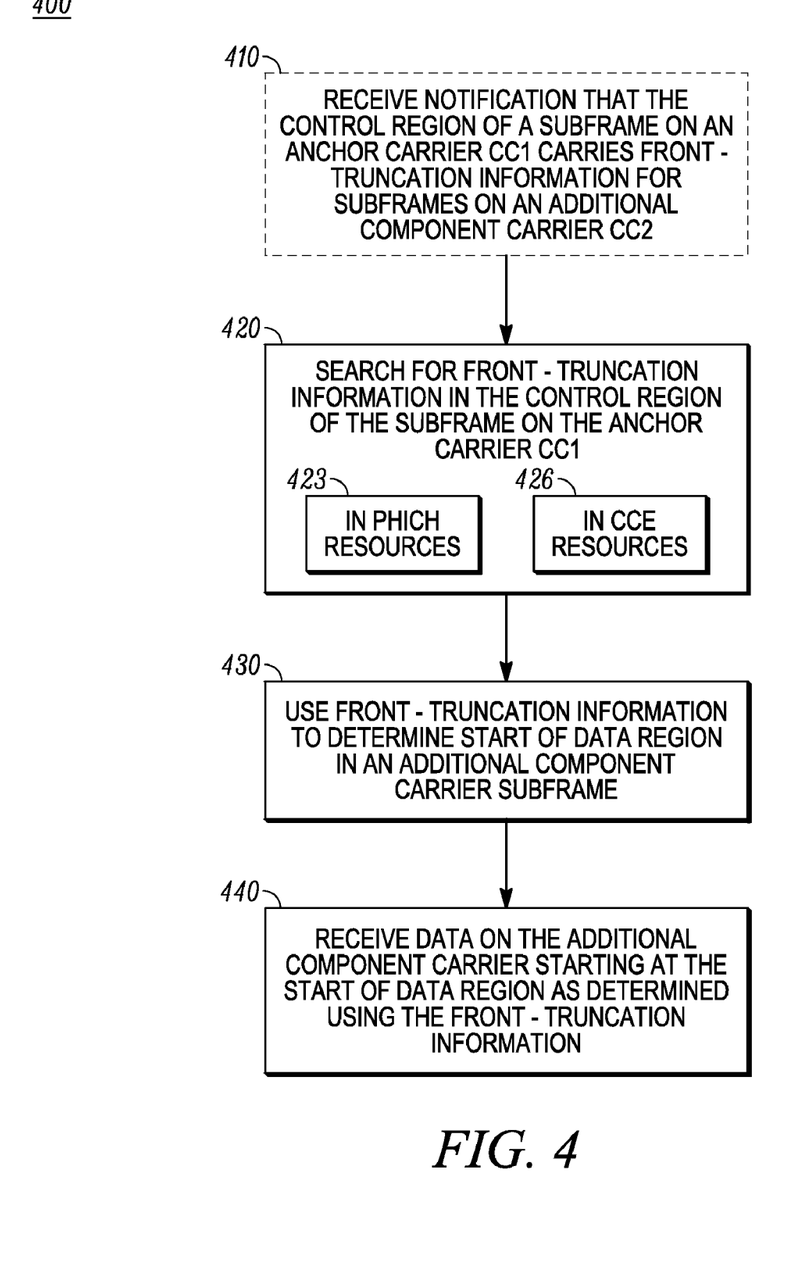
FIG. 4 illustrates a flow diagram for a remote terminal receiving, in a control region of a subframe on an anchor carrier, front-truncation time period information and using this front-truncation time period information to access a front-truncated subframe component on an additional component carrier.

FIG. 4 illustrates a flow diagram 400 for a remote terminal 104, 108 receiving, in a control region 151, 161 of a subframe 150, 160 on an anchor carrier 110, front-truncation time period information and using this front-truncation time period information to access a front-truncated subframe component 154, 164 on an additional component carrier 120. A remote terminal (such as remote terminal 104, 108 shown in FIG. 1) that supports carrier aggregation receives 410 notification that resources in the control region of an anchor carrier subframe carry front-truncation information for an additional component carrier. This notification can be sent via dedicated Radio Resource Control (RRC) signaling from the serving base unit, broadcast RRC signaling, or using an implicit indication. An implicit indication could be a particular downlink bandwidth of an anchor carrier, a particular Physical Cell IDentifier (PCID) of an anchor carrier, or a particular subframe index of a subframe transmitted on an anchor carrier. Because control region resources can be reallocated on a dynamic (e.g., every subframe or every radio frame) or semi-static (e.g., using RRC configuration messages) basis, step 410 is optional in some instances.

If the serving base unit uses RRC signaling to indicate that front-truncation information is being transmitted on resources in the control region of an anchor carrier subframe, the RRC signaling can directly specify either the PHICH groups indices, the PHICH resource indices within each PHICH group, or the CCE indices that carry this information. Alternately, the RRC signaling can merely indicate the quantity of PHICH groups, the quantity of PHICH resources within each PHICH group, or the quantity of CCEs that carry the front-truncation information directly using a number or indirectly using a scaling factor. In a case where the RRC signaling indicates a quantity, the remote terminal can use a predefined conversion function to calculate the set of resources (e.g., the set of PHICH REGs, the set of PHICH resources within each PHICH REG, or the set of CCEs) used to signal the front-truncation information. If the remote terminal receives both the quantity and indices, the remote terminal can verify one received data point using the other received data point. Further redundancy can be obtained by using both PHICH resources and CCE resources for transmitting front-truncation information.

Based on the notification, the remote terminal knows to search 420, in the control region 151, 161 of a subframe 150, 160 on an anchor carrier 110 (see FIG. 1), for front-truncation information within a set of over-provisioned resources reserved for PHICH signaling 423 and/or from a set of REGs corresponding to a reallocated CCE 426. After the front-truncation information is extracted from the appropriate resources, the remote terminal uses 430 the front-truncation information to determine when a first OFDM symbol used for receiving a PDSCH on an additional component carrier 120 will begin. If front-truncation information is encoded in the same manner as a PCFICH signal (e.g., the front-truncation time period is either 1, 2, or 3 OFDM symbols in duration—note that a fourth value of 0 OFDM symbols is also possible), the remote terminal can determine the boundary for proper PDSCH decoding by waiting for the front-truncation time period starting from the beginning time boundary of a standard 1 ms subframe. Then, the remote terminal receives 440 a PDSCH signal on the additional downlink component carrier in the first and subsequent OFDM symbols of a front-truncated subframe component.

If a remote terminal that does not support carrier aggregation (e.g., remote terminal 109 shown in FIG. 1) receives a downlink subframe with CCEs reallocated to front-truncation signaling, the CCEs that are reallocated to front-truncation information will not form a valid PDCCH signal for the remote terminal 109, so the remote terminal will simply monitor other CCEs in search of its own PDCCH. In other words, a remote terminal 109 that does not support carrier aggregation will be unaware that certain CCEs have been mapped for use as resources to convey front-truncation information for subframes on an additional component carrier.

If a remote terminal that does not support carrier aggregation (e.g., remote terminal 109 shown in FIG. 1) receives a downlink subframe with additional PHICH resources that are allocated for front-truncation information signaling, the remote terminal will only decode the default PHICH resources and will not decode the additional PHICH resources. The wireless base unit (e.g., base unit 102 shown in FIG. 1) configures the default and additional PHICH resources such that indices (e.g., either the PHICH group indices or the PHICH indices within each PHICH group) of default and additional PHICH resources do not overlap.

Figure 5:
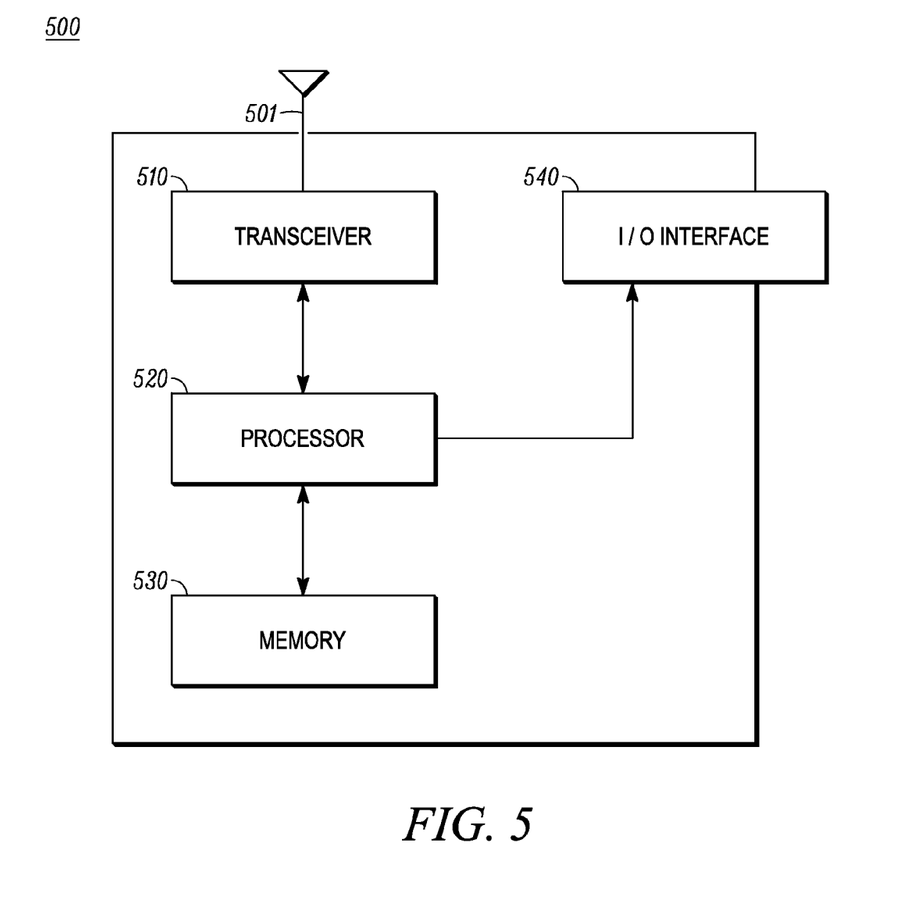
FIG. 5 illustrates a wireless communication remote terminal that supports carrier aggregation with at least an anchor carrier and an additional component carrier.

FIG. 5 illustrates a wireless communication remote terminal 500 that supports carrier aggregation with at least an anchor carrier and an additional component carrier. The terminal 500 may be implemented as remote terminal 104, 108 shown in FIG. 1. The remote terminal 500 includes an antenna 501, a transceiver 510 coupled to the antenna 501, a processor 520 (or controller) coupled to the transceiver 510, a memory 530 coupled to the processor 520, and a user interface 540 coupled to the processor 520.

The transceiver 510 is capable of communicating through the antenna 501 with user terminals and base stations pursuant to a wireless communication protocol such as LTE Release 8 evolutions that supports carrier aggregation with at least an anchor carrier and an additional component carrier.

As shown in FIG. 5, the processor 520 is implemented as a programmed processor; however, the functionality described may alternately be implemented on a general-purpose or special-purpose computer, a programmed microprocessor or microcontroller, peripheral integrated circuit elements, an application-specific integrated circuit (or other integrated circuits), hardware logic elements such as a discrete element circuit, a programmable logic device such as a programmable logic array, field-programmable gate array, or the like.

In FIG. 5, the memory 530 may include volatile and non-volatile data storage, including one or more electrical, magnetic, or optical memories such as a random access memory (RAM), cache, hard drive, read-only memory (ROM), firmware, or other memory device. The memory may have a cache to speed access to specific data. Data may be stored in the memory in a database format or another format.

The I/O device interface 540 connects to one or more input devices that may include a keyboard, keypad, mouse, touch screen, microphone, voice-recognition device, or any other device that accepts input. The I/O device interface may also connect to one or more output devices, such as a monitor or display, printer, disk drive, audio speakers, or any other device provided to output data.

The processor 520 is configured to implement the flow diagram 400 of FIG. 4 with the interaction of software stored in memory 530. One or more software, hardware, or combination hardware-and-software modules may be developed to perform each step 410, 420 (including steps 423 and/or 426), 430, 440 to properly receive data on an additional component carrier.

By reallocating control region resources of a subframe on an anchor carrier for use in signaling truncation information of a reduced subframe component on an additional component carrier, a base unit supporting carrier aggregation can instruct served remote terminals supporting carrier aggregation regarding boundaries for receiving data in the truncated subframe component on the additional downlink component carrier. The disclosed PHICH resouces and CCE reallocation techniques support such truncation signaling without affecting much any served remote terminals that do not support carrier aggregation. Transmitting truncated subframe components on additional downlink component carriers promotes interference management in heterogeneous wireless networks by allowing a base unit that supports carrier aggregation to avoid transmitting during a control region of a subframe transmitted on the same or overlapping component carrier frequencies by an uncoordinated second base unit. Notifying served remote terminals that support carrier aggregation of the truncation time period assists in reducing errors caused by improperly determining OFDM symbols of a reduced subframe component PDSCH.

The base unit may also transmit a control message on the anchor carrier for indicating downlink control information regarding assigned resources on the additional component carrier. The truncation time period information and the control message containing the additional grant information such as Modulation and Coding Scheme (MCS), hybrid-ARQ information, etc., helps the remote unit to determine the boundary of the PDSCH on the additional component carrier. The front-truncation time period information and the downlink control information may be jointly protected with CRC coding.

While this disclosure describes using PHICH resources on an anchor carrier to signal truncation information on an additional component carrier, the same method can be used for broadcast signaling of a small number of bits for another purpose. For example, a format indicator may be signaled on PHICH resources to indicate the format of a particular downlink or uplink control region, to indicate whether (and which) additional Physical Random Access Channel (PRACH) resources are available in an uplink subframe, to indicate whether a particular uplink or downlink resource is available or not, to enable/disable transmission of uplink control or data information from the UEs, or whether (and where) additional reference symbols are present in a particular subframe or not, etc.

While this disclosure includes what are considered presently to be the embodiments and best modes of the invention described in a manner that establishes possession thereof by the inventors and that enables those of ordinary skill in the art to make and use the invention, it will be understood and appreciated that there are many equivalents to the embodiments disclosed herein and that modifications and variations may be made without departing from the scope and spirit of the invention, which are to be limited not by the embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

We claim:

1. A method, in a wireless base unit that supports carrier aggregation with at least an anchor carrier and an additional component carrier, comprising:
    determining a truncation time period in order to create a truncated subframe component on the additional component carrier;
    transmitting the truncated subframe component on the additional component carrier; and
    transmitting truncation time period information within a control region of a subframe on the anchor carrier.

2. A method according to claim 1 wherein the transmitting truncation time period information comprises:
    using at least a portion of the resources reserved for Physical Hybrid-ARQ Indicator Channel (PHICH) signaling.

3. A method according to claim 2 wherein the using comprises:
    using Radio Resource Control (RRC) signaling to reserve default PHICH resources and additional PHICH resources; and
    using the additional PHICH resources for truncation time period information signaling.

4. A method according to claim 1 wherein the transmitting truncation time period information comprises:
    using Control Channel Element (CCE) resources 5. A method according to claim 1 further comprising:
    receiving information regarding at least a duration of a control region in a subframe to be transmitted by an uncoordinated base unit on the additional component carrier.

6. A method according to claim 5 wherein the truncated subframe component does not interfere with the control region in the subframe transmitted by the uncoordinated base unit.

7. A method according to claim 1 further comprising:
    transmitting a control message on the anchor carrier, for indicating downlink control information regarding assigned resources on the additional component carrier.

8. A method according to claim 1 wherein the truncated subframe component carries at least one Physical Downlink Shared Channel (PDSCH).

9. A method according to claim 1 wherein the truncated subframe component is a front-truncated subframe component.

10. A method, in a wireless communication remote terminal that supports carrier aggregation with at least an anchor carrier and an additional component carrier, comprising:
    searching a control region of a subframe received on the anchor carrier for truncation information for a subframe component received on the additional component carrier;
    using the truncation information to determine a boundary of a data region in the subframe component received on the additional component carrier; and
    receiving data in the subframe component received on the additional component carrier based on the boundary of the data region.

11. A method according to claim 10 further comprising:
    receiving a notification that the control region of the subframe received on the anchor carrier carries the truncation information for the subframe component received on the additional component carrier.

12. A method according to claim 11 wherein the receiving the notification comprises:
    implicitly receiving the notification based on one or more of (1) a downlink bandwidth of the anchor carrier, (2) a Physical Cell Identifier (PCID) of the anchor carrier, (3) a subframe index of the subframe transmitted on the anchor carrier.

13. A method according to claim 11 wherein the notification indicates that the truncation information is carried in resources reserved for Physical Hybrid-ARQ Indicator Channel (PHICH) signaling.

14. A method according to claim 11 wherein the notification indicates that the truncation information is carried in Control Channel Element (CCE) resources.

15. A method according to claim 11 wherein the receiving the notification comprises:
    receiving either a Radio Resource Control (RRC) signal or a broadcast signal.

16. A method according to claim 10 wherein the searching comprises:
    decoding CCE resources to obtain the truncation information.

17. A method according to claim 10 wherein the searching comprises:
    decoding PHICH resources to obtain the truncation information.

18. A method according to claim 10 wherein the searching comprises:
receiving a control message on the anchor carrier and using the control message to determine downlink control information regarding assigned resources on the additional component carrier.

19. A method according to claim 10 wherein the receiving data comprises:
receiving data carried on a Physical Downlink Shared Channel (PDSCH) in the subframe component received on the additional component carrier.

20. A wireless communication remote terminal that supports carrier aggregation with at least an anchor carrier and an additional component carrier, comprising:
a wireless transceiver;
a controller, coupled to the wireless transceiver, for configuring the wireless transceiver to receive a subframe on the anchor carrier and the additional component carrier;
searching a control region of the subframe on the anchor carrier for truncation information for a subframe component received on the additional component carrier;
using the truncation information to determine a boundary of a data region in the subframe component received on the additional component carrier; and
receiving data in the subframe component received on the additional component carrier based on the boundary of the data region.

* * * * *